Feb. 3, 1959  L. H. ANDERSON  2,872,228
SHAFT COUPLING
Filed May 21, 1957

INVENTOR.
LAWRENCE H. ANDERSON
BY
Donald G. Dalton
HIS ATTORNEY

United States Patent Office 2,872,228
Patented Feb. 3, 1959

2,872,228

SHAFT COUPLING

Lawrence H. Anderson, Homestead, Pa.

Application May 21, 1957, Serial No. 660,709

3 Claims. (Cl. 287—129)

This invention relates to an improved coupling for joining two shafts in end-to-end relation.

An object of the invention is to provide an improved box-type shaft coupling which can be assembled or dismantled more readily than conventional couplings.

A more specific object is to provide a coupling of this type in which the connecting bolts lie in slots formed in the respective coupling boxes, thus eliminating need for stringing the bolts through the usual bores.

In accomplishing these and other objects of the invention, I have provided improved details of structure, a preferred form of which is shown in the accompanying drawing, in which.

Figure 1:
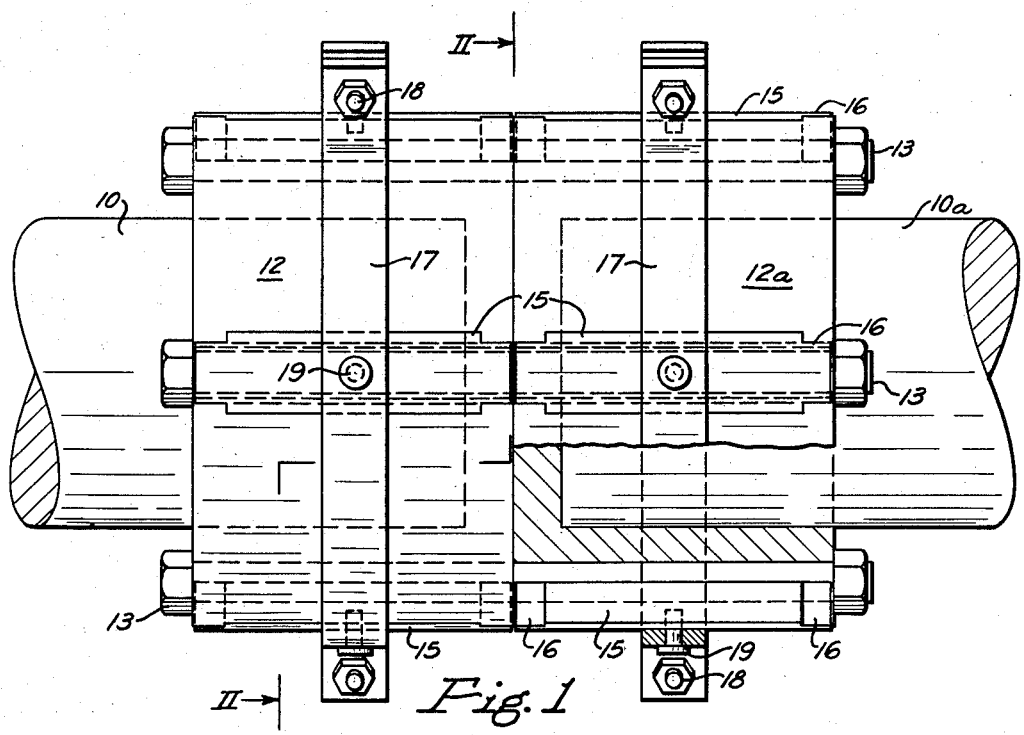
Figure 1 is a side elevational view of my coupling.
Figure 2:
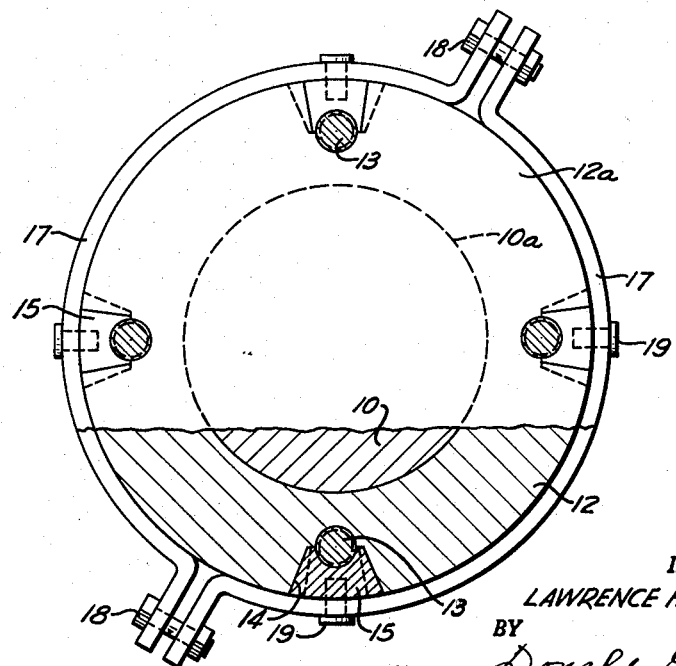
Figure 2 is a vertical section on line II—II of Figure 1.

The drawing shows a pair of axially aligned shafts 10 and 10a, whose ends carry cylindrical coupling boxes 12 and 12a respectively fixed thereto by any suitable conventional means not shown. A plurality of longitudinal extending bolts 13, illustrated as four in number, connect the two coupling boxes together so that a driving torque can be transmitted from one shaft to the other.

In accordance with my invention, the outer faces of the coupling boxes contain outwardly open slots or grooves 14 which receive the bolts 13. Individual removable fillers 15 are fitted into the grooves and cover the bolts. Preferably the grooves have narrowed end portions, and the ends of the fillers have reduced portions 16 to correspond. Split retainer bands 17 surround the respective coupling boxes to hold the fillers in place and are held together with bolts 18. Preferably cap screws 19 connect the bands 17 to the respective fillers 15 to furnish a firmer connection.

In a conventional coupling the bolts extend through bores in the respective boxes. Excessive loads on the shafts tend to bend or otherwise damage the bolts. When the coupling is dismantled, removal of damaged bolts is a difficult operation, often requiring use of a sledge hammer to drive them from the boxes. Restricted working space around the coupling may add to the difficulty. With my invention it is only necessary to remove the cap screws 19 and bolts 18, after which the bands 17, fillers 15 and bolts 13 can be lifted away from the coupling boxes 12 and 12a. When the coupling is assembled, the bolts 13 can readily be laid in the slots 14, and there is no need to string them through small bores which may be difficult to align.

While I have shown and described only a single embodiment of my invention, it is apparent that modifications may arise. Therefore, I do not wish to be limited to the disclosure set forth but only by the scope of the appended claims.

I claim:

1. In combination with a pair of axially aligned shafts a coupling comprising a pair of boxes fixed to the ends of the respective shafts, each of said boxes having longitudinally extending outwardly open slots in its outer face aligned with the respective slots in the other box, bolts received in aligned pairs of slots in the two boxes, individual removable fillers fitted into said slots and covering said bolts, and retainer bands surrounding the respective boxes and holding said fillers in place.

2. In combination with a pair of axially aligned shafts, a coupling comprising a pair of cylindrical boxes fixed to the ends of the respective shafts, each of said boxes having longitudinally extending outwardly open slots in its outer face aligned with the respective slots in the other box, bolts received in aligned pairs of slots in the two boxes, individual removable fillers fitted into said slots and covering said bolts, split retainer bands bolted together and surrounding the respective boxes and holding said fillers in place, and fasteners connecting said bands to said fillers.

3. A combination as defined in claim 2 in which said slots have narrowed ends and said fillers have correspondingly reduced end portions.

References Cited in the file of this patent

UNITED STATES PATENTS

| | | |
|---|---|---|
| 870,696 | Stetler | Nov. 12, 1907 |
| 953,506 | Baum | Mar. 29, 1910 |
| 1,484,216 | Hekking | Feb. 19, 1924 |
| 1,781,032 | Redfield | Nov. 11, 1930 |